United States Patent
Putman et al.

(10) Patent No.: US 10,481,379 B1
(45) Date of Patent: Nov. 19, 2019

(54) METHOD AND SYSTEM FOR AUTOMATICALLY MAPPING FLUID OBJECTS ON A SUBSTRATE

(71) Applicant: Nanotronics Imaging, Inc., Cuyahoga Falls, OH (US)

(72) Inventors: Matthew C. Putman, Brooklyn, NY (US); John B. Putman, Celebration, FL (US); John Cruickshank, Brooklyn, NY (US); Julie Orlando, Akron, OH (US); Adele Frankel, New York, NY (US); Brandon Scott, New York, NY (US)

(73) Assignee: NANOTRONICS IMAGING, INC., Cuyahoga Falls, OH (US)

( * ) Notice: Subject to any disclaimer, the term of this patent is extended or adjusted under 35 U.S.C. 154(b) by 0 days.

(21) Appl. No.: 16/164,990

(22) Filed: Oct. 19, 2018

(51) Int. Cl.
  G06K 9/32 (2006.01)
  G02B 21/36 (2006.01)
  G02B 21/00 (2006.01)
  G06T 7/73 (2017.01)

(52) U.S. Cl.
  CPC ....... G02B 21/365 (2013.01); G02B 21/0032 (2013.01); G02B 21/361 (2013.01); G06K 9/3241 (2013.01); G06T 7/73 (2017.01)

(58) Field of Classification Search
  CPC .............. G02B 21/365; G02B 21/0032; G02B 21/361; G06T 7/73; G06K 9/3241
  USPC .......................................................... 348/79
  See application file for complete search history.

(56) References Cited

U.S. PATENT DOCUMENTS

| | | | | |
|---|---|---|---|---|
| 5,153,444 A * | 10/1992 | Maeda | ............. | G01N 21/95607 250/559.05 |
| 6,005,660 A * | 12/1999 | Yoshida | ................ | B08B 7/0042 356/237.3 |
| 6,249,347 B1 * | 6/2001 | Svetkoff | .............. | G01B 11/026 356/237.5 |
| 6,292,582 B1 * | 9/2001 | Lin | .................. | G01N 21/95607 257/E23.179 |
| 6,507,417 B1 * | 1/2003 | Makihira | .............. | G06T 7/0004 358/486 |
| 6,584,236 B1 * | 6/2003 | Maruo | .................. | G06T 7/0004 250/559.06 |
| 6,968,079 B2 * | 11/2005 | Yoshikawa | ........... | G06T 7/0002 356/237.4 |

(Continued)

OTHER PUBLICATIONS

Toribio et al, An algorithm to extract physical characteristics of nematodes from microscopic images of plat roots (Year: 2018).*

(Continued)

*Primary Examiner* — Shan E Elahi
(74) *Attorney, Agent, or Firm* — Polsinelli PC

(57) ABSTRACT

A method and system for mapping fluid objects on a substrate using a microscope inspection system that includes a light source, imaging device, stage for moving a substrate disposed on the stage, and a control module. A computer analysis system includes an object identification module that identifies for each of the objects on the substrate, an object position on the substrate including a set of X, Y, and θ coordinates using algorithms, networks, machines and systems including artificial intelligence and image processing algorithms. At least one of the objects is fluid and has shifted from a prior position or deformed from a prior size.

19 Claims, 11 Drawing Sheets

(56) References Cited

U.S. PATENT DOCUMENTS

| | | | | |
|---|---|---|---|---|
| 7,068,834 B1* | 6/2006 | Ikeda | G06F 3/0486 | 356/237.4 |
| 7,112,813 B2* | 9/2006 | Den Boef | G03F 9/7046 | 250/548 |
| 7,129,727 B2* | 10/2006 | Saito | G01R 31/307 | 324/754.03 |
| 7,184,132 B2* | 2/2007 | Tsao | G01N 21/95 | 356/30 |
| 7,221,486 B2* | 5/2007 | Makihira | G06T 7/0004 | 352/58 |
| 7,676,077 B2* | 3/2010 | Kulkarni | G06F 17/5045 | 382/144 |
| 7,728,294 B2* | 6/2010 | Hiroi | G01R 31/307 | 250/306 |
| 7,916,926 B2* | 3/2011 | Naya | G06F 3/1454 | 345/156 |
| 8,373,113 B2* | 2/2013 | Nakayama | B82Y 35/00 | 250/252.1 |
| 8,396,582 B2* | 3/2013 | Kaushal | G05B 13/0265 | 700/104 |
| 8,428,336 B2* | 4/2013 | Ikeda | G06F 3/0486 | 382/144 |
| 8,712,118 B2* | 4/2014 | De La Torre-Bueno | G01N 21/6458 | 382/128 |
| 9,018,627 B2* | 4/2015 | Kanda | H01L 21/67028 | 257/48 |
| 9,995,766 B2* | 6/2018 | Reed | B82Y 35/00 | |
| 10,048,477 B1* | 8/2018 | Putman | G02B 21/002 | |
| 10,169,852 B1* | 1/2019 | Putman | G06T 5/50 | |
| 10,239,178 B2* | 3/2019 | Rueb | H04N 9/3155 | |
| 10,290,092 B2* | 5/2019 | Amzaleg | G06T 7/001 | |
| 10,306,494 B2* | 5/2019 | Foegelle | H04B 7/0617 | |
| 10,333,632 B2* | 6/2019 | Vikstedt | H04B 17/16 | |
| 2002/0001404 A1 | 1/2002 | Yoshikawa | G06T 7/0002 | 382/145 |
| 2003/0030853 A1* | 2/2003 | Makihira | G06T 7/0004 | 358/486 |
| 2003/0218872 A1* | 11/2003 | Tsukada | H05K 9/0077 | 361/816 |
| 2004/0008867 A1* | 1/2004 | Fein | G01N 21/6458 | 382/100 |
| 2005/0002016 A1* | 1/2005 | Tsao | G01N 21/95 | 356/30 |
| 2005/0031188 A1* | 2/2005 | Luu | G06T 7/0006 | 382/145 |
| 2005/0174580 A1* | 8/2005 | Svetkoff | G01B 11/026 | 356/601 |
| 2006/0087330 A1* | 4/2006 | Saito | G01R 31/307 | 324/754.03 |
| 2006/0200253 A1* | 9/2006 | Hoffberg | G05B 15/02 | 700/19 |
| 2006/0274932 A1* | 12/2006 | Ikeda | G06F 3/0486 | 382/145 |
| 2007/0024643 A1* | 2/2007 | Naya | G06F 3/1454 | 345/629 |
| 2007/0096763 A1* | 5/2007 | Ehrmann | G01R 31/2891 | 324/750.23 |
| 2010/0007727 A1* | 1/2010 | Torre-Bueno | G01N 21/6458 | 348/79 |
| 2010/0053745 A1* | 3/2010 | Sander | G02B 21/22 | 359/389 |
| 2010/0314540 A1* | 12/2010 | Adler | H01J 37/06 | 250/307 |
| 2011/0013820 A1* | 1/2011 | Reed | B82Y 35/00 | 382/133 |
| 2011/0210250 A1* | 9/2011 | Nakayama | B82Y 35/00 | 250/310 |
| 2013/0194410 A1* | 8/2013 | Topman | G06K 9/0014 | 348/79 |
| 2014/0204194 A1* | 7/2014 | Otani | G01B 11/00 | 348/79 |
| 2015/0035440 A1* | 2/2015 | Spero | B60Q 1/04 | 315/153 |
| 2015/0090879 A1* | 4/2015 | Zeidler | H01J 37/28 | 250/307 |
| 2015/0146215 A1* | 5/2015 | Kobayashi | G01B 11/2504 | 356/610 |
| 2015/0332451 A1* | 11/2015 | Amzaleg | G06T 7/001 | 382/149 |
| 2017/0068771 A1* | 3/2017 | Muchaidze | G06F 17/5081 | |
| 2017/0276471 A1* | 9/2017 | Jiang | G01B 9/02004 | |
| 2019/0041846 A1* | 2/2019 | Cella | H04L 1/0002 | |

OTHER PUBLICATIONS

Yu et al, Effects of photosensitive film sidewall profile with different exposure wavelength and process characteristics of planting bump technology (Year: 2006).*

Mehr et al, An overview of scanning acoustic microscope, a reliable method for non-destructive failure analysis of microelectronic components (Year: 2015).*

Image Registration Methods: A Survey; B. Zitova, J. Flusser / Image and Vision Computing 21 (2003) 977-1000; Jun. 26, 2003.

Affine Transformations; Appendix C.

Article: Number Determination of Successfully Packaged Dies Per Wafer Based on Machine Vision; Hsuan-Ting Chang, Ren-Jie Pan and Hsiao-Wei Peng; Machines 2015, 3, 72-92; doi: 10.3390/machines3020072; www.mdpi.com/journal/machines.

A Neutral-Network Approach for Semiconductor Wafer Post-Sawing Inspection; Chao-Ton Su, Taho Yang, and Chir-Mour Ke; IEEE Transactions on Semiconductor Manufacturing, vol. 15, No. 2, May 2002.

Neural Network Techniques for Object Orientation Detection: Solution by Optimal Feedforward Network and Learning Vector Quantization Approaches; R.J.T. Morries, L.D. Rubin, and H. Tirri; IEEE Transactions on Pattern Analysis and Machine Intelligence, vol. 12, No. 11, Nov. 1990.

Rotation-Invariant Neural Pattern Recognition System Estimating a Rotation Angle; Minoru Fukumi, Sigeru Omatu, Member, IEEE, and Yoshikazu Nishikawa; IEEE Transactions on Neural Networks, vol. 8, No. 3, May 1997.

Distortion Tolerant Pattern Recognition Based on Self-Organizing Feature Extraction; Jouko Lampinen, Member IEEE, and Erkki Oja, Senior Member, IEEE; IEEE Transactions on Neural Networks, vol. 6, No. 3, May 1995.

Instantiating Deformable Models with a Neural Net; Christopher K.I. Williams, Michael Revow, and Geoffrey E. Hinton; Department of Computer Science, University of Toronto, Toronto, Ontario, Canada M5S 1A4; Computer Vision and Image Understanding, vol. 68, No. 1, Oct., pp. 120-26, 1997, Article No. IV970540.

Content-Based Image Retrieval at the End of the Early Years; Arnold W.M. Smeulders, Senior Member, IEEE, Marcel Worring, Member, IEEE, Simone Santini, Member, IEEE, Amarnath Gupta, Member, IEEE, and Ramesh Jain, Fellow, IEEE; IEEE Transactions on Pattern Analysis and Machine Intelligence, vol. 22, No. 12, Dec. 2000.

Deep Machine Learning—A New Frontier in Artificial Intelligence Research; Itamar Arel, Derek C. Rose, and Thomas P. Karnowski, The University of Tennessee, USA; Digital Object Identifier 10.1109/MCI.2010.938364.

Learning to Track at 100 FPS with Deep Regression Networks; David Held, Sebastian Thrun, Silvio Savarese; Department of Computer Science Standford University.

Barbara Zitova, "Image Registration Methods: A Survey," Image and Vision Computing, Oct. 11, 2003, vol. 21, Issue 11, pp. 977-1000.

Donald H. House et al., Foundations of Physically Based Modeling and Animation, 335-341, 2017.

* cited by examiner

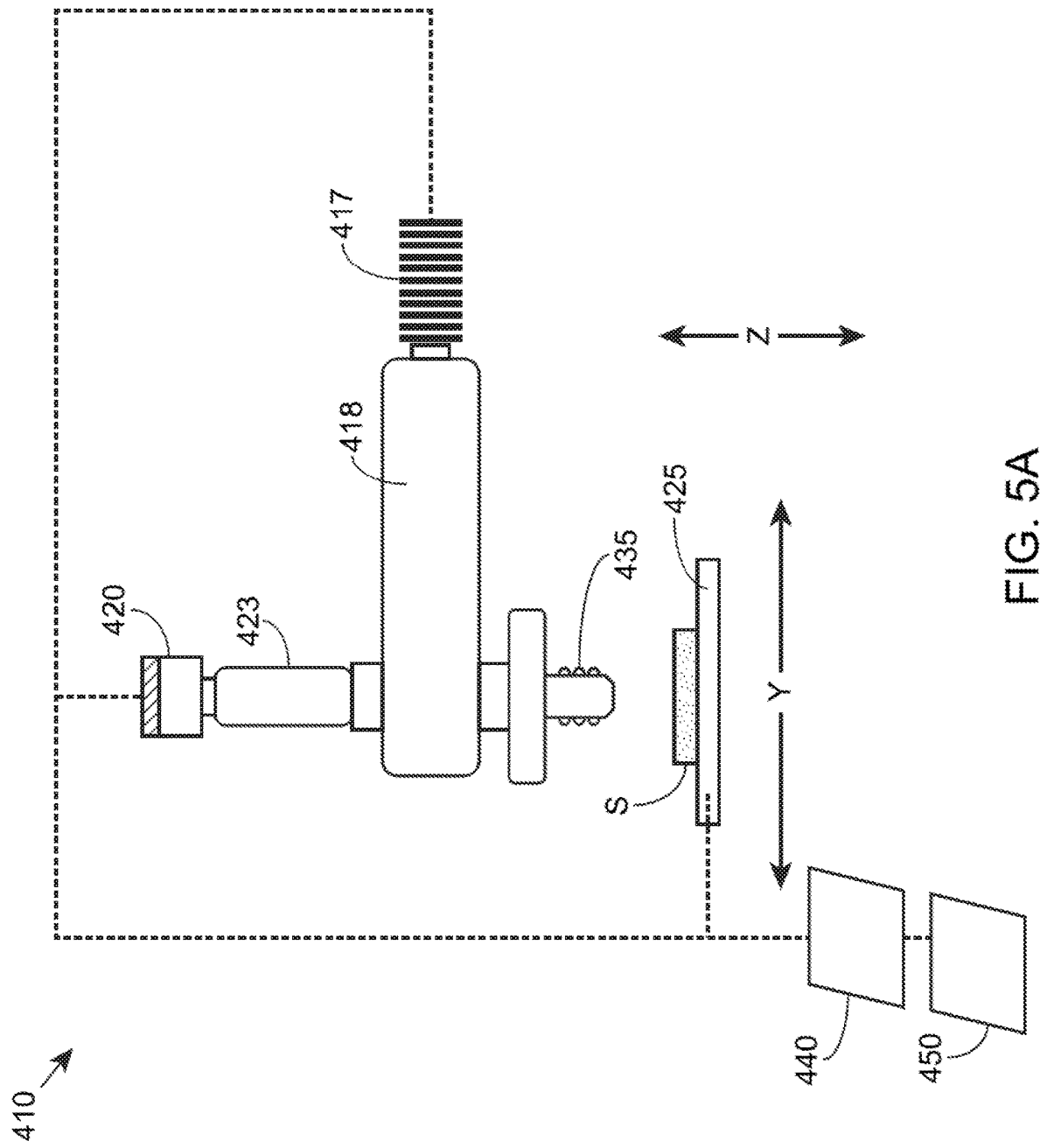

US 10,481,379 B1

METHOD AND SYSTEM FOR AUTOMATICALLY MAPPING FLUID OBJECTS ON A SUBSTRATE

TECHNICAL FIELD

The embodiments of the present disclosure relate to automatically mapping fluid objects on a substrate.

BACKGROUND

Inspecting materials for uniformity and detection of anomalies is important in disciplines ranging from manufacturing to science to biology. Inspection often employs microscope inspection systems to examine and measure electronic objects on a substrate (e.g., a wafer) or features of a biological specimen mounted on a slide. Specimens as understood by a person of ordinary skill in the art refer to an article of examination (e.g., a wafer or a biological slide). Electronic objects on a substrate can include devices such as transistors, resistors, capacitors, integrated circuits, microchips, etc. Biological specimens are typically mounted on slides for microscopic inspection. Objects, as understood by a person of ordinary skill in the art, has a broad meaning as provided in the specification and recited in the claims, and can refer to electronic objects on a substrate or biological objects such as cells, tissue or the like found in a biological specimen mounted on a slide among others. Although the following description refers to examining objects on a substrate that are electrical in nature, the automatic mapping described herein can be used to examine biological specimens and objects mounted on slides.

Microscope inspection systems can be used to image objects on a substrate for later analysis. To facilitate accurate analysis, it is helpful to capture consistent images of like objects, or consistent images of an object and its reference template (sometimes referred to as a golden template). For example, if an object is smaller than the field of view of an imaging device, then like objects can be aligned in the same way in relation to an imaging device, so that captured images of the like objects all show similar alignment of the imaged object (referred to herein as "imaging alignment position"). In one embodiment, as shown for example in FIGS. 1A and 1B, the upper left corner 115, 115 of objects 120, 120 each appears in the upper left corner of the field of view of an imaging device, represented by a single square 110, 110. Although the orientation of object 120 has rotated, field of view 110 has rotated as well, to maintain the same alignment of objects 120 and 120 in the captured images.

Note, the term field of view as understood by a person of ordinary skill in the art is in the context of digital microscope and refers to an area of examination that is captured at once by an image sensor. Further, a person of ordinary skill in the art will readily understand that the terms field of view, image and tile are used interchangeable herein.

In another example, as shown in FIG. 2, when an object 220 on substrate 310 exceeds the field of view of an imaging device, as represented by each tile 215, then a sequence of images (e.g., tiles 1-18) might be needed to capture the entire object. Note, field of view and tile are used interchangeably herein. To facilitate accurate analysis, it is helpful to capture the sequence of images in a consistent manner, with a similar imaging alignment position, across like objects or compared to a reference template. In one example, a first image can be captured starting at a specific feature on the object or at a specific location (e.g., upper left corner 115) on the object (referred to herein as the "starting scan position" and indicated by *) and subsequent images can be captured, for example, in a predefined sequencing path (e.g., in a serpentine manner as indicated by sequencing path 230 as shown on FIG. 2). Each image in the sequence can be assigned a number (e.g., 1-18) and images with the same number can be compared across like objects or to a reference template.

Knowing the exact position and orientation of each object and/or features of the objects on a substrate can facilitate correct alignment of a stage, imaging device and object to capture images where like objects are consistently aligned within the field of view, or a similar sequence of images are captured for like objects. Aside from image capture, knowing the position and orientation of an object and/or feature of an object on a substrate can be useful for various stages of a manufacturing or an examination process and/or for anomaly analysis. In some embodiments, an object can have indicators on the object itself to help determine the orientation of the object (e.g., asterisk (*) 225a that appears in the upper left corner and plus sign (+) 225b that appears in the lower right corner of specimen 220).

An initial object layout map can specify the X, Y, θ coordinates of each object on a substrate ("expected position" or "original position"). For example, X, Y can refer to a coordinate position of each object 220 in relation to a common reference point on a substrate (e.g., an origin point), and θ can refer to the orientation of each object 220 or a biological specimen in relation to an origin point relative to a known coordinate system, as explained further within. However, an initial object layout map typically does not account for movement (i.e., movement is referred to in the specification and claims as "fluid" and means that an object is capable of movement from an original position to a later position) of the objects during examination and/or manufacturing process from their initial X, Y, θ coordinates. When printing objects on a bendable or elastomeric ("flexible") substrate (e.g., polymide, PEEK or transparent conductive polyester film), printing a flexible object (e.g., a flexible OLED), examining fluid biological specimens mounted on a slide and/or examining objects post-dicing (e.g., on a hoop ring, Gel-Pak®, waffle pack), the objects can shift from their original or expected X, Y, θ coordinates (e.g., as specified in an initial object layout map). Deformation of a flexible substrate and/or flexible object can also occur, which can also alter the expected X, Y, θ coordinates of objects on a substrate or biological specimens on a slide. Deformation (also known as morphing by a person of ordinary skill in the art) can refer to deviations between an object and a reference object in overall dimensions and/or individual features of the objects. The reference object can refer to a reference template image for that object type and/or an earlier version of the object.

Accordingly, it is desirable to provide new mechanisms for automatically mapping fluid objects on a substrate (e.g., by determining the X, Y, θ coordinates of each object on a substrate) to locate objects that have shifted from their expected coordinates on a substrate (e.g., as compared to an initial object layout map), as well as to predict X, Y, θ coordinates of an object on a substrate at different stages in an examination or manufacturing process.

SUMMARY OF THE EMBODIMENTS OF THE PRESENT DISCLOSURE

An embodiment of the present disclosure is directed to a method for mapping fluid objects on a substrate using a microscope inspection system that includes a microscope inspection system having a microscope system and a computer analysis system. The microscope system includes a light source, imaging device, stage for moving a substrate disposed on the stage, and a control module. The computer analysis system includes an object identification module. The method includes the steps of performing a scan of the substrate using the microscope inspection system and identifying, for each of the objects on the substrate, an object position on the substrate including a set of X, Y, and θ coordinates using algorithms, networks, machines and systems including artificial intelligence and image processing algorithms. At least one of the objects is fluid and has shifted from a prior position or deformed from a prior size. The method also includes a step of generating object mapping information that reflects the position of each of the objects and a shift or deformity amount for each of the objects. The step of generating object mapping information is done automatically using algorithms, networks, machines and systems including artificial intelligence and image processing algorithms.

Another embodiment of the present disclosure is directed to a method for mapping fluid objects on a substrate using a microscope inspection system that includes a microscope inspection system having a microscope system and a computer analysis system. The microscope system includes a light source, imaging device, stage for moving a substrate disposed on the stage, and a control module. The computer analysis system includes an object identification module and an object layout prediction module. The method includes the steps of performing a scan of the substrate using the microscope inspection system and identifying, for each of the objects on the substrate, an object position on the substrate including a set of X, Y, and θ coordinates using algorithms, networks, machines and systems including artificial intelligence and image processing algorithms. At least one of the objects is fluid and has shifted from a prior position or deformed from a prior size. The method also includes a step of generating object mapping information that reflects the position of each of the objects and a shift or deformity amount for each of the objects. The step of generating object mapping information is done automatically using algorithms, networks, machines and systems including artificial intelligence and image processing algorithms.

Yet another embodiment of the present disclosure is directed to a system for mapping fluid objects on a substrate that includes a microscope system having a light source, imaging device, stage for moving a substrate disposed on the stage, and a control module. The imaging device scans the substrate. The system also includes an object layout identification module for identifying for each of the objects on the substrate, an object position on the substrate including a set of X, Y, and θ coordinates using algorithms, networks, machines and systems including artificial intelligence and image processing algorithms. At least one of the objects is fluid and at least one of the objects has shifted from a prior position or deformed from a prior size. The object layout identification module generates object mapping information that reflects the position of each of the objects and a shift or deformity amount for each of the objects.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting in their scope, the principles herein are described and explained with additional specificity and detail through the use of the accompanying drawings in which:

FIG. 5A shows a side view of an embodiment of a microscope system showing an imaging device, light source, objectives, specimen, stage, control module, and computer analysis module.

DETAILED DESCRIPTION

In accordance with some embodiments of the disclosed subject matter, mechanisms (which can include methods, systems, devices, apparatuses, etc.) for automatically mapping fluid objects on a substrate (e.g., by determining the X, Y, θ coordinates of each object on a substrate) to locate objects that have shifted from their initial or expected position on a substrate (e.g., as compared to an initial object layout map) are provided. This can be useful to facilitate alignment of a stage, imaging device and object to capture suitable image(s) of an object, to calibrate later stages of an examining or manufacturing process to account for any shifting of objects and/or for anomaly analysis. This can also be useful to locate objects when an initial object layout map for a substrate is not provided, even when the objects have not shifted at all. In some embodiments, automatic mapping includes, not the actual X, Y, θ coordinates objects on a substrate, but predicting where the X, Y, θ coordinates of objects on a substrate will be during different stages of an examining or manufacturing process. This can be useful to appropriately position objects on a substrate or to calibrate steps and/or components in a manufacturing or an examining process to accommodate expected shifting and/or deformation of an object and/or substrate.

Figure 3A:
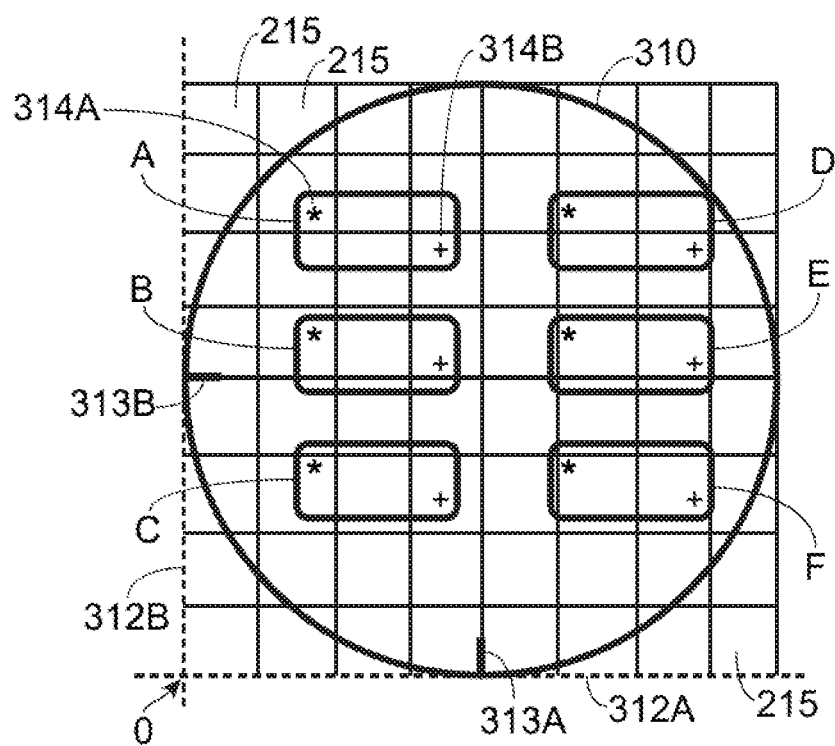
FIG. 3A shows an initial object layout which includes example layouts of objects A-F on a substrate at different stages in a manufacturing process or occurring at different times in an examination process.
Figure 3B:
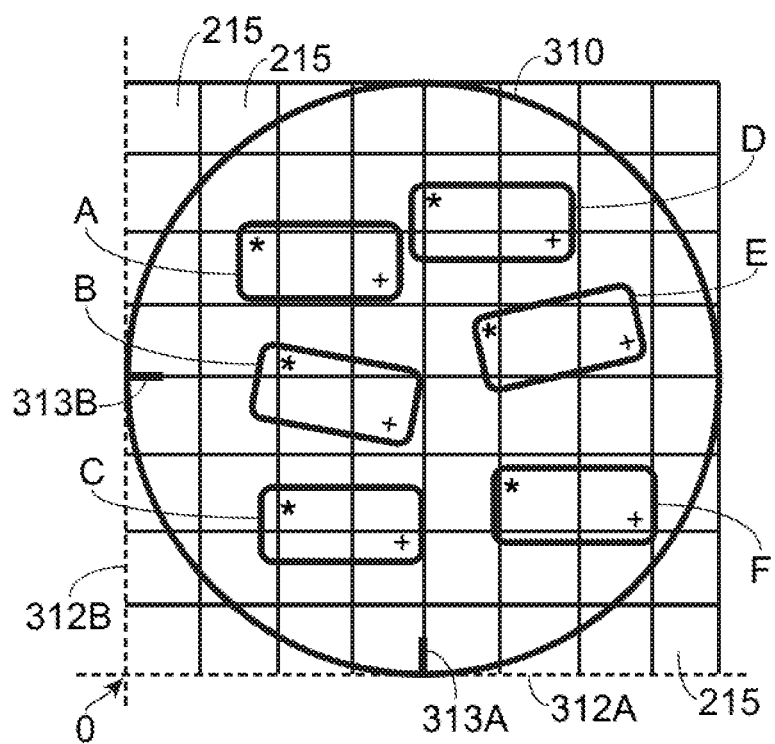
FIG. 3B shows a later object layout which includes example layouts of objects A-F on a substrate 310 at different positions than those shown in FIG. 3A at different stages in a manufacturing process or occurring at different times in an examination process.

FIGS. 3A (an initial object layout) and 3B (a later object layout), illustrate example layouts of objects A-F on a substrate 310 at different stages in a manufacturing process or occurring at different times in an examining process, in accordance with some embodiments of the disclosed subject matter. Each tile 215 represents an image or a field of view. As shown in FIGS. 3A and 3B, a Cartesian XY coordinate system can be used to define the X, Y location of each object A-F on substrate 310. The XY coordinate location of each object A-F represents a distance from coordinate axes 312A and 312B that meet at origin point (O). In some embodiments, the coordinate axes can be a pair of perpendicular lines that extend from two reference indices 313A and 313B found on substrate 310. Note that coordinate axes 312A and 312B and origin point O are just examples, the coordinate location of an object A-F can be measured from other coordinate axes and origin point O and/or from another reference point(s). In other embodiments, an object can be located by: its polar coordinates in relation to an origin point and/or any other suitable location. The XY location can refer to the location of a specific portion of an object (e.g., upper left hand corner) and/or the location of a specific feature of an object.

Each object A-F includes orientation marks 314A (e.g., an asterisk (*)) and 314B (e.g., a plus sign (+)) that can be used to determine the orientation of an object in relation to origin point O. For example, in an initial layout of the objects as shown in FIG. 3A, the asterisk appears in the upper left corner of each object and the plus sign appears in the lower right corner of each object. FIG. 3A represents a model position for objects A-F. The model position can also be the same position as a reference template for objects A-F and used to analyze any shift in object A-F, as shown in FIG. 3B. In FIG. 3B, many of the objects have shifted from their initial XY locations, and the orientation of the objects has changed as well, as demonstrated by the new location of the asterisk and plus signs in relation to origin point O. Orientation marks 314B, 314B are just examples and other orientation marks can be used to determine orientation and degree of rotation from an expected or an initial orientation. In some embodiments, features of the object can be used to determine orientation of the object. Note, objects on a substrate can be the same type of object or different types of objects.

As disclosed herein, in some embodiments, artificial intelligence can be used to detect an object, classify an object type, identify an imaging alignment position for an object, identify a starting scan position, determine the X, Y, and θ coordinates of an object and/or predict the X, Y, θ coordinates of each object on a substrate. The artificial intelligence algorithms can include one or more of the following, alone or in combination: machine learning, hidden Markov models; recurrent neural networks; convolutional neural networks; Bayesian symbolic methods; general adversarial networks; support vector machines; image registration methods; applicable machine learning techniques; applicable rule-based system; and/or any other suitable artificial intelligence algorithm. Such algorithms, networks, machines and systems provide examples of structures used with respect to any "means for automatically detecting an object using artificial intelligence."

Figure 4:
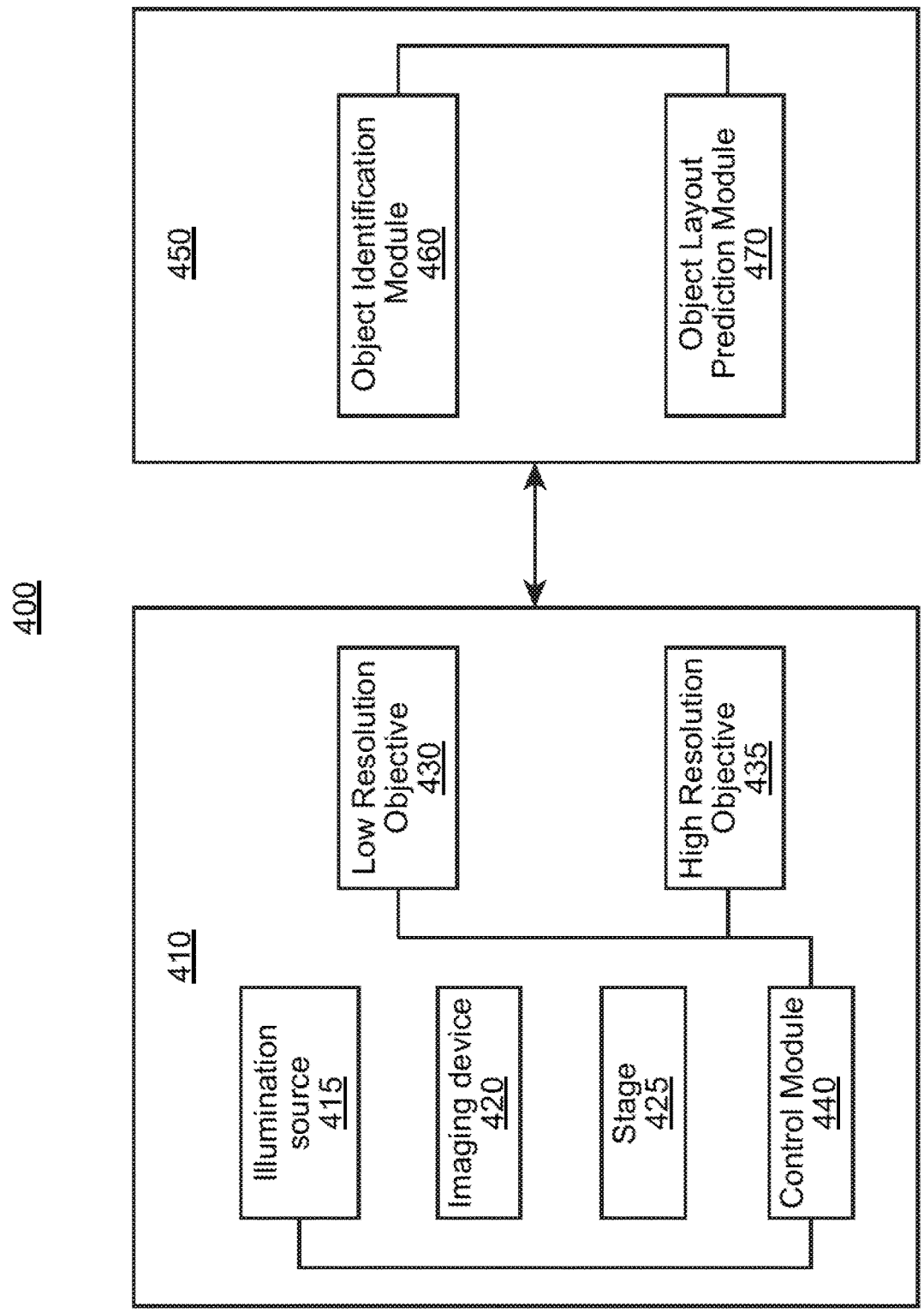
FIG. 4 shows an example of an automatic mapping microscope inspection system including a microscope system and computer analysis module.

FIG. 4 illustrates an example automatic mapping microscope inspection system 400 that can implement automatically mapping fluid objects on a substrate, according to some embodiments of the disclosed subject matter. Automatically mapping fluid objects on a substrate can include for each object on a substrate (or a subset of objects): i) detecting and classifying an object; ii) determining the X, Y, θ coordinates of an object on a substrate; iii) determining object deformation; iv) determining object shifting; v) determining an object starting scan position; vi) determining an object imaging alignment position; and/or vii) determining an object sequencing path.

Figure 5B:
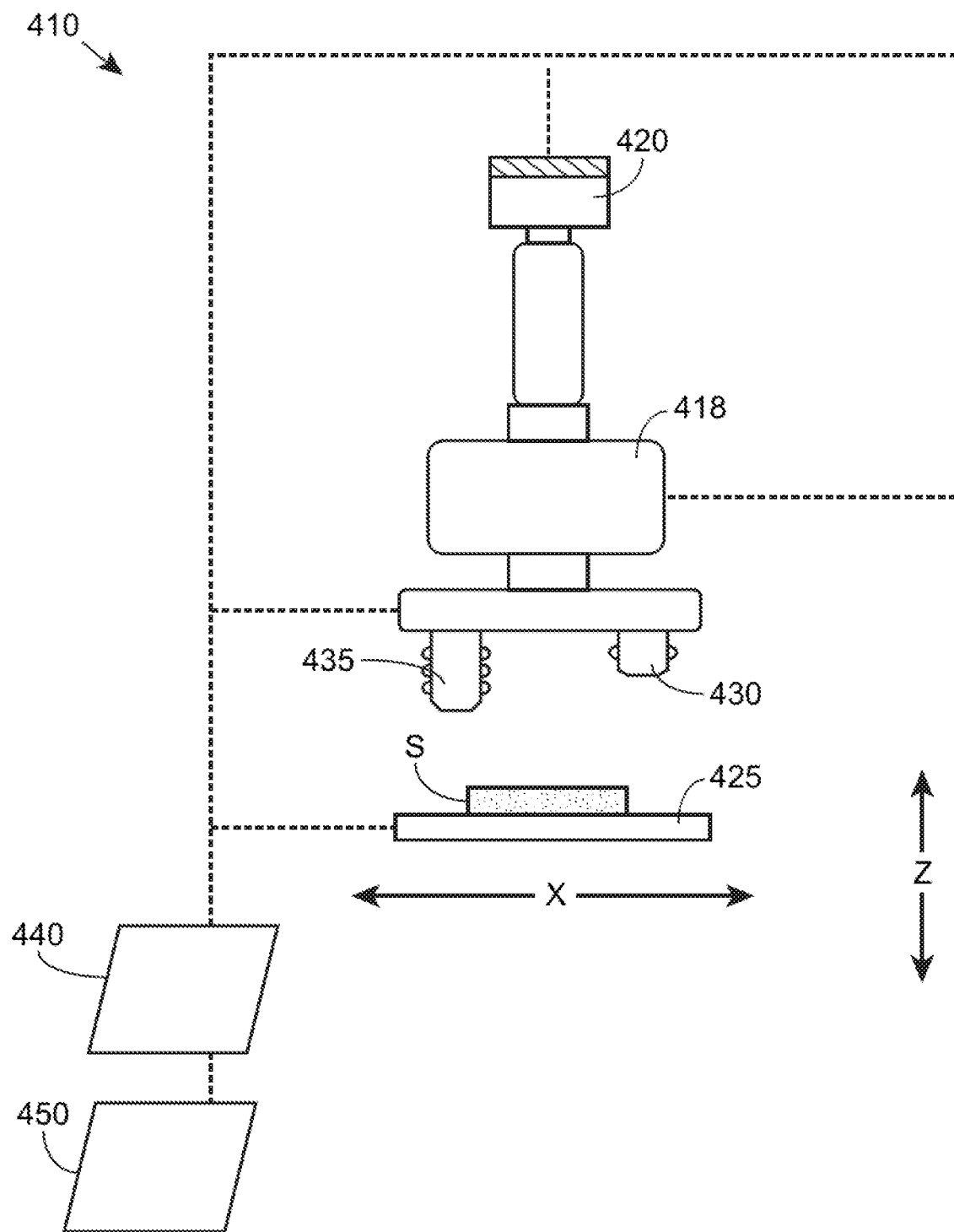
FIG. 5B shows a front view of an embodiment of a microscope system showing an imaging device, light source, objective, specimen, stage, control module, and computer analysis system.

At a high level, the basic components of an automatic mapping microscope inspection system 400, according to some embodiments, include microscope system 410 and a computer analysis system 450. The functionality of computer analysis system 450 can be incorporated into microscope system 410 (as shown, for example, in FIGS. 5A and 5B) or can be a separate component (as shown for example in FIG. 4). Microscope system 410 can include an illumination source 415 to provide light to an object, an imaging device 420, a stage 425, a low-resolution objective 430, a high resolution objective 435, and control module 440 comprising hardware, software and/or firmware.

Microscope system 410 can be implemented as part of any suitable type of microscope. For example, in some embodiments, system 410 can be implemented as part of an optical microscope that uses transmitted light or reflected light. More particularly, system 410 can be implemented as part of the nSpec® optical microscope available from Nanotronics Imaging, Inc. of Cuyahoga Falls, Ohio Microscope system 410 can also be implemented as part of confocal or two-photon excitation microscopy.

FIGS. 5A (side view) and 5B (front view), show the general configuration of an embodiment of microscope system 410, in accordance with some embodiments of the disclosed subject matter. According to some embodiments, microscope system 410 can include low resolution objective 430 and high resolution objective 435. Low resolution objective 430 and high resolution objective 435 have different resolving powers. Low resolution objective 430 and high resolution objective 435 can also have different magnification powers, and/or be configured to operate with bright field/dark field microscopy, differential interference contrast (DIC) microscopy and/or any other suitable form of microscopy including fluorescence. In some embodiments, high resolution scanning of an object can be performed by using a high resolution microscope like a scanning electron microscope (SEM), a transmission electron microscope (TEM), and/or an atomic force microscope (AFM). In some embodiments, a high resolution microscope can be a microscope that has a magnifying power (e.g., 100×) greater than a low resolution microscope (e.g., 5×). The objective and/or microscope technique used to inspect an object can be controlled by software, hardware, and/or firmware in some embodiments.

In some embodiments, an XY translation stage can be used for stage 425. The XY translation stage can be driven by stepper motor, server motor, linear motor, piezo motor, and/or any other suitable mechanism. The XY translation stage can be configured to move an object in the X axis and/or Y axis directions under the control of any suitable controller, in some embodiments. An actuator (not shown but known in the art) can be used to make coarse focus adjustments of, for example, 0 to 5 mm, 0 to 10 mm, 0 to 30 mm, and/or any other suitable range(s) of distances. An actuator can also be used in some embodiments to provide fine focus of, for example, 0 to 50 µm, 0 to 100 µm, 0 to 200 µm, and/or any other suitable range(s) of distances. In some embodiments, microscope system 410 can include a focus mechanism that adjusts stage 425 in a Z direction towards and away from objectives 430 and 435 and/or adjusts low resolution objective 430 and high resolution objective 435 towards and away from stage 425.

Light source 417 can vary by intensity, number of light sources used, and/or the position and angle of illumination. Light source 417 can transmit light through reflected light illuminator 418 and can be used to illuminate a portion of a specimen, so that light is reflected up through tube lens 423 to imaging device 420 (e.g., camera), and imaging device 420 can capture images and/or video of the object. In some embodiments, the light source 417 used can be a white light collimated light-emitting diode (LED), an ultraviolet collimated LED, lasers or fluorescent light.

In some embodiments, imaging device 420 can be a rotatable camera that includes an image sensor. The image sensor can be, for example, a CCD, a CMOS image sensor, and/or any other suitable electronic device that converts light into one or more electrical signals. Such electrical signals can be used to form images and/or video of an object. Some example methods for rotating a camera that can be used by microscope system 410 are described in U.S. Pat. No. 10,048,477 entitled "Camera and Object Alignment to Facilitate Large Area Imaging in Microscopy," which is hereby incorporated by reference herein in its entirety.

Different topographical imaging techniques can be used (including but not limited to, shape-from-focus algorithms, shape-from-shading algorithms, photometric stereo algorithms, and Fourier ptychography modulation algorithms) with a predefined size, number, and position of illuminating light to generate one or more three-dimensional topography images of an object.

In some embodiments, control module 440 as shown in FIG. 5*a*, includes a controller and controller interface, and can control any settings of automatic mapping microscope inspection system 400 (e.g., light source 417, low resolution objective 430 and high resolution objective 435, stage 425, and imaging device 420), as well as communications, operations (e.g., taking images, turning on and off a light source 417, moving stage 425 and/or objectives 430, 435, and/or rotating imaging device 420). Control module 440 and applicable computing systems and components described herein can include any suitable hardware (which can execute software in some embodiments), such as, for example, computers, microprocessors, microcontrollers, application specific integrated circuits (ASICs), field-programmable gate arrays (FPGAs) and digital signal processors (DSPs) (any of which can be referred to as a hardware processor), encoders, circuitry to read encoders, memory devices (including one or more EPROMS, one or more EEPROMs, dynamic random access memory ("DRAM"), static random access memory ("SRAM"), and/or flash memory), and/or any other suitable hardware elements. In some embodiments, individual components within automatic mapping microscope inspection system 400 can include their own software, firmware, and/or hardware to control the individual components and communicate with other components in automatic mapping microscope inspection system 400.

In some embodiments, communication between the control module (e.g., the controller and controller interface) and the components of automatic mapping microscope inspection system 400 can use any suitable communication technologies, such as analog technologies (e.g., relay logic), digital technologies (e.g., RS232, ethernet, or wireless), network technologies (e.g., local area network (LAN), a wide area network (WAN), the Internet) Bluetooth technologies, Near-field communication technologies, Secure RF technologies, and/or any other suitable communication technologies.

In some embodiments, operator inputs can be communicated to control module 440 using any suitable input device (e.g., keyboard, mouse, joystick, touch).

Referring back to FIG. 4, computer analysis system 450 of automatic mapping microscope inspection system 400 can be coupled to, or included in, microscope system 410 in any suitable manner using any suitable communication technology, such as analog technologies (e.g., relay logic), digital technologies (e.g., RS232, ethernet, or wireless), network technologies (e.g., local area network (LAN), a wide area network (WAN), the Internet) Bluetooth technologies, Near-field communication technologies, Secure RF technologies, and/or any other suitable communication technologies. Computer analysis system 450, and the modules within computer analysis system 450, can be configured to perform a number of functions described further herein using images output by microscope system 410 and/or stored by computer readable media.

Computer analysis system 450 can include any suitable hardware (which can execute software in some embodiments), such as, for example, computers, microprocessors, microcontrollers, application specific integrated circuits (ASICs), field-programmable gate arrays (FPGAs), and digital signal processors (DSPs) (any of which can be referred to as a hardware processor), encoders, circuitry to read encoders, memory devices (including one or more EPROMS, one or more EEPROMs, dynamic random access memory ("DRAM"), static random access memory ("SRAM"), and/or flash memory), and/or any other suitable hardware elements.

Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

According to some embodiments, computer analysis system 450 can include an object identification module 460

(described later and shown in FIG. 8) and an object layout prediction module 470 (described later and shown in FIG. 8.)

Figure 6A:
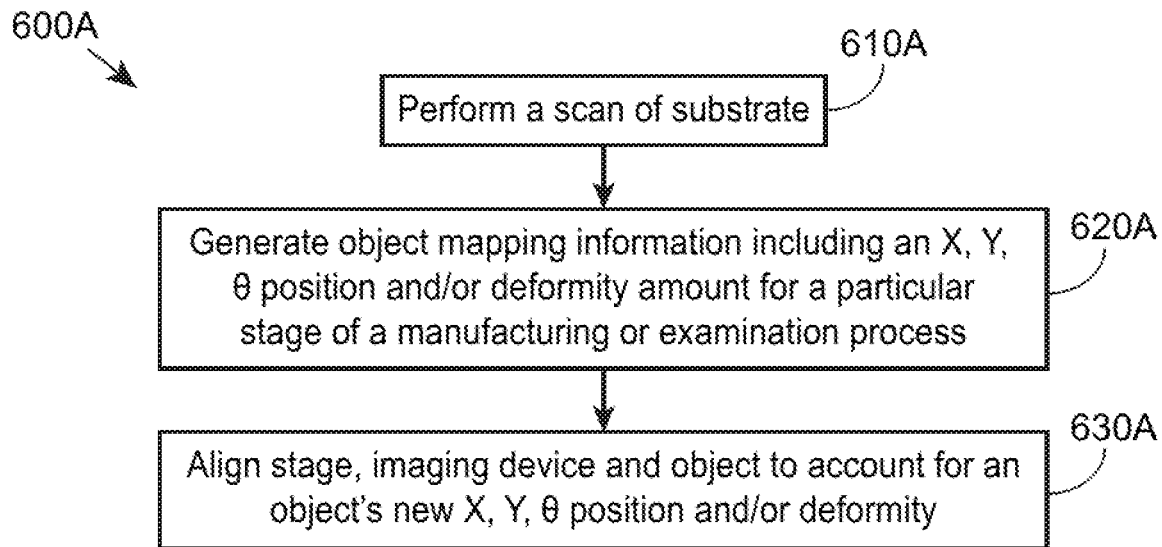
FIG. 6A shows example method steps for automatically mapping a fluid object on a substrate.
Figure 6B:
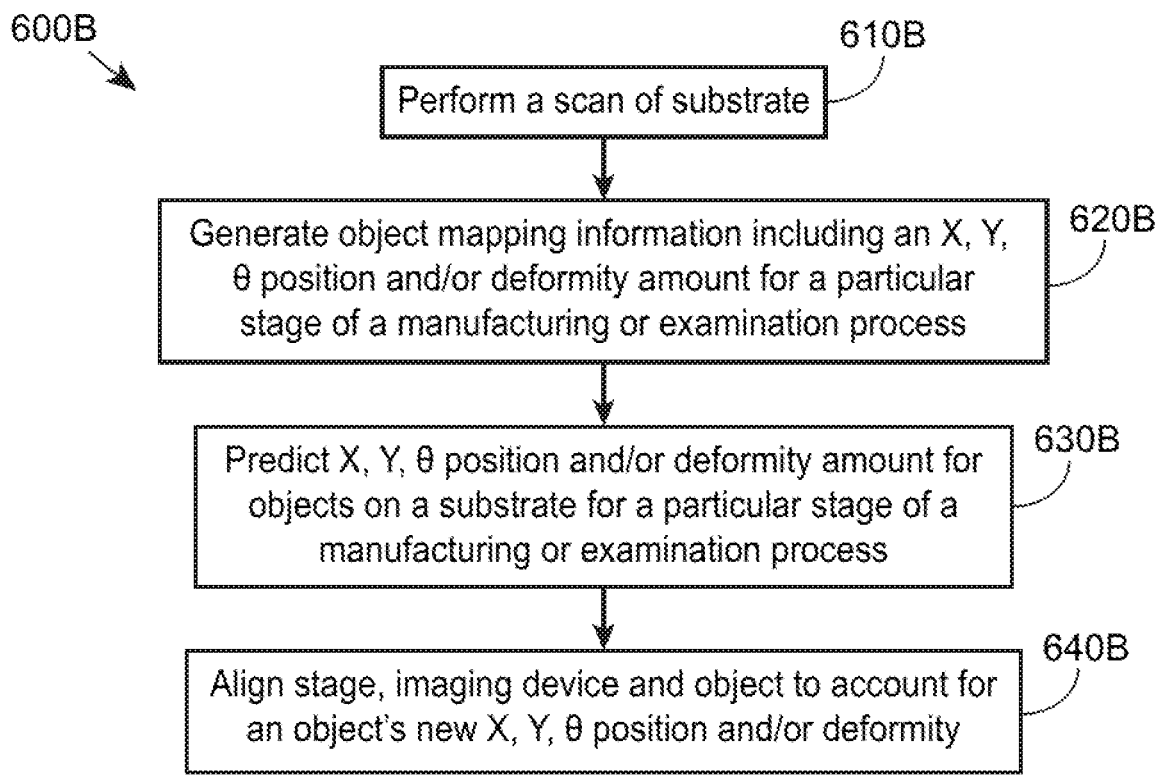
FIG. 6B shows example method steps for automatically mapping a fluid object on a substrate including a prediction step.

FIGS. 6A and 6B show at a high level, example methods 600A and 600B for automatically mapping a fluid object on a substrate using artificial intelligence, in accordance with some embodiments of the disclosed subject matter. In some embodiments, automatic mapping operation 600A and 600B can use automatic mapping microscope inspection system 400. Further details explaining how each module of computer analysis system 450 can be configured, in accordance with some embodiments of the disclosed subject matter, will be described in connection with FIG. 8.

At 610A, microscope system 410 can scan a substrate using for example low resolution objective 430 or high resolution objective 435. In some embodiments, the substrate can be scanned by moving imaging device 420 and/or stage 425 in an X/Y direction until the entire surface or a desired area ("region of interest") of a substrate is scanned. A low resolution scan can refer to a series of low resolution images of a substrate, or a portion of a substrate, captured and generated by imaging device 420 using low resolution objective 430. A high resolution scan can refer to a series of high resolution images, of a substrate, or a portion of a substrate, captured and generated by imaging device 420 using high resolution objective 435.

Figure 1A:
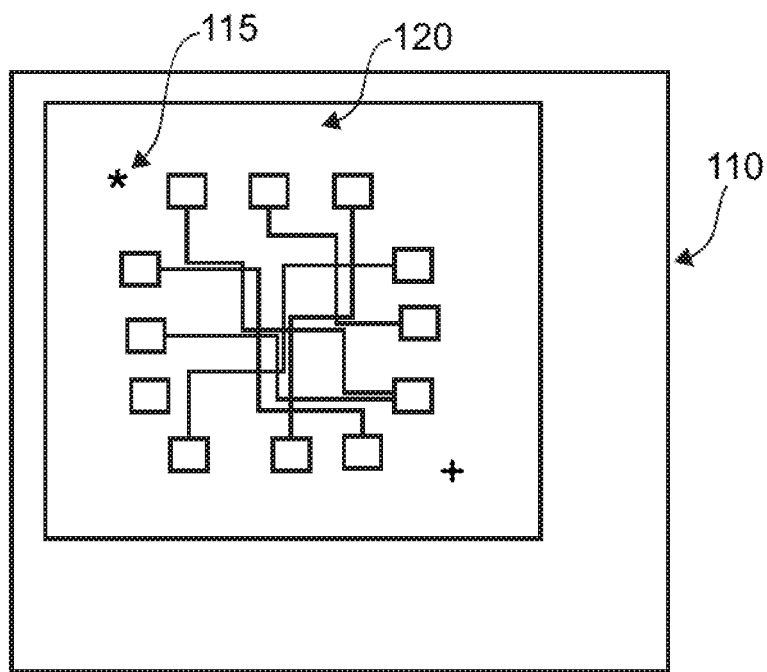
FIG. 1A shows a top view of a field of view of an object on an imaging tile.
Figure 1B:
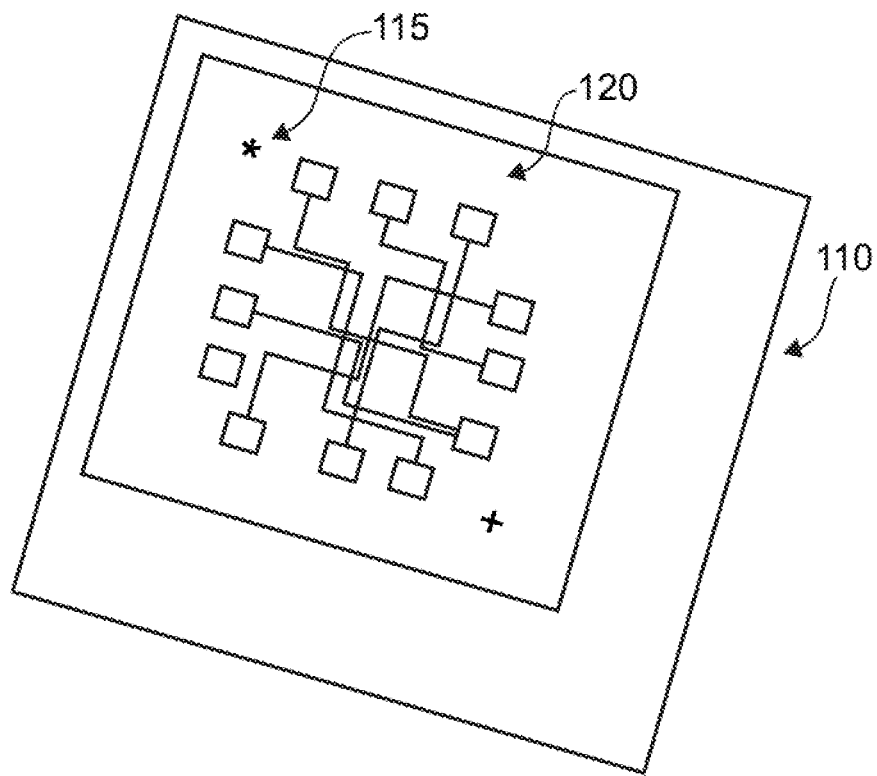
FIG. 1B shows a top view of a field of view of an object on an imaging tile, where the field of view and the object have been rotated as compared to FIG. 1.
Figure 2:
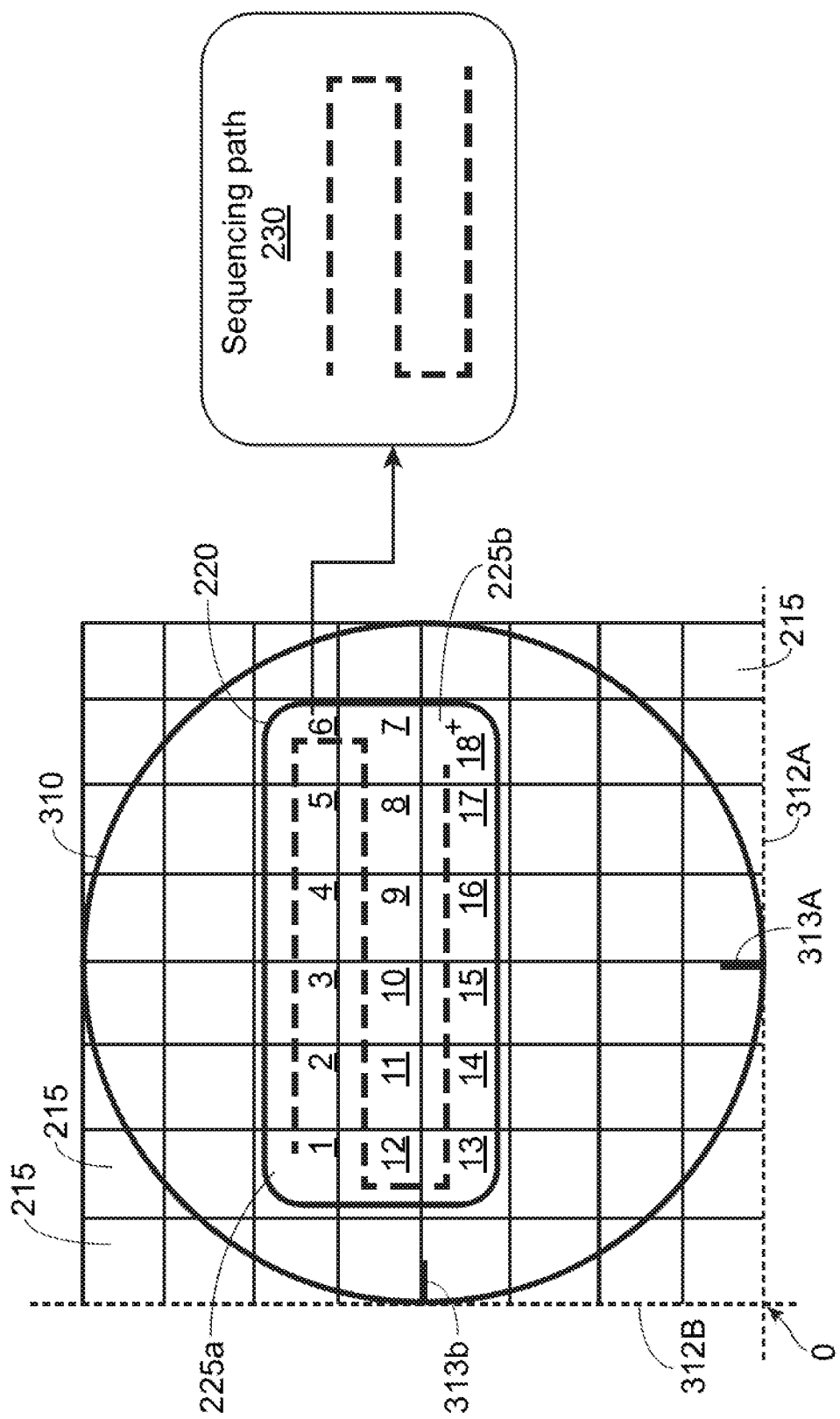
FIG. 2 shows an object on a substrate that exceeds the field of view of an imaging device, as represented by each tile, then a sequence of images (e.g., tiles 1-18) is needed to capture the entire object.

In some embodiments, each image of a substrate is referred to as a tile 215 (as shown in FIG. 2), wherein each tile 215 can be located by its XY coordinate position in a substrate space. The tiles 215 can be stitched together based on their XY coordinate positions and/or feature-based registration methods into a single coherent scan of the substrate 310. In some embodiments, one or more areas of a substrate 310 can be scanned by using different focus levels and moving stage 425 and/or low resolution objective 430 in a Z direction.

Referring back to FIG. 6A, at 620A, object identification module 460 (shown in FIG. 8), can receive low or high resolution images of the scanned substrate and use artificial intelligence algorithms, computer vision and/or other suitable computer programs (as explained further herein) to determine and generate object mapping information including: i) detecting objects on a substrate; ii) identifying object type; iii) determining an object's X, Y, θ coordinates; iv) identifying an imaging alignment position and determining the X, Y, θ coordinates of such position; v) identifying a starting scan position and determining the X, Y, θ coordinates of such position; vi) determining an imaging sequence for each object, or any number of objects, on a substrate; vii) calculating object and/or substrate deformation (e.g., as compared to a prior or original size) and/or object shift from an original position (e.g., as compared to an initial object layout map). In some embodiments, object mapping information can be used by object layout identification module 460 to generate an object layout map of the substrate that represents a current layout of the objects on a substrate, which due to object and/or substrate flexibility can be different from an initial object layout map of the substrate.

Referring again to FIG. 6A, at 630A, object identification module 460, can transmit object mapping information to control module 440. In some embodiments (e.g., for embodiments where the object is smaller than the field of view), control module 440 can align the stage, the imaging device and the object to account for an object's new X, Y, θ coordinates and/or deformity. For example, if the object is smaller than the field of view, then control module 440 can drive the stage 425 and/or imaging device 420 to an imaging alignment position for each object (or any number of objects) on the substrate, in accordance with the object mapping information for the substrate. The imaging alignment position can be based on a representative position of a similar object to or a reference template for the object being scanned. In other embodiments (e.g., if the object is larger than the field of view), control module 440 can drive the stage 425 and/or the imaging device 420, to a starting scan position for each object (or any number of objects) on the substrate to take a sequence of images in accordance with the imaging sequence for that object type and the object mapping information for the object. The starting scan position and imaging sequence can be based on a representative position and sequence of a similar object to or a reference template for the object being scanned. In some embodiments, the type of object that is being imaged will determine the starting scan position, imaging alignment position and/or imaging sequence. In further embodiments, a sequence of images for an object can be pre-processed into one larger image and compared to a reference object for analysis.

Figure 7A:
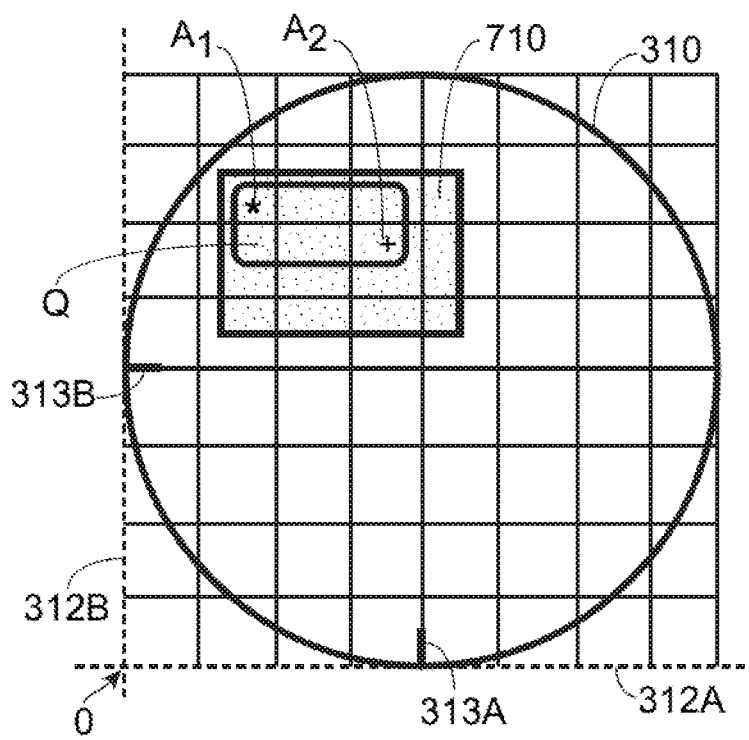
FIG. 7A shows object Q at a first instance with object Q aligned in an upper left portion of a virtual tile.
Figure 7B:
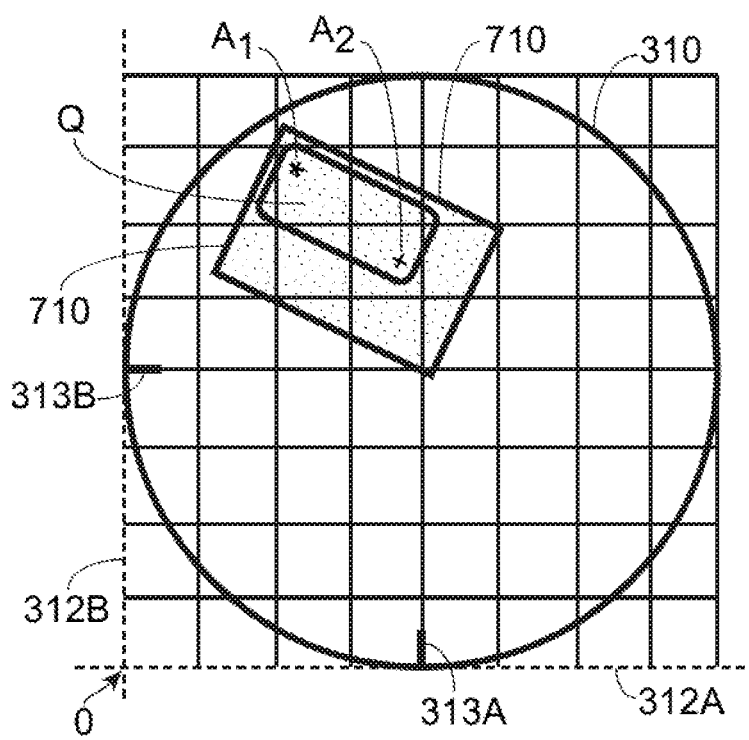
FIG. 7B shows object Q at a second instance, after it has shifted from a first position as shown in FIG. 7A.

In further embodiments, based on the X, Y, θ coordinates and/or deformity of an object a virtual tile 710 (shown in FIG. 7A) can be created that encompasses the dimensions of an object. All objects of the same type can be aligned within a virtual tile in the same way to facilitate analysis. An object can be aligned within a virtual tile, similar to the alignment of a reference template for that object. A virtual tile is a number of smaller scans that are pre-processed into one larger scan. FIG. 7A shows object Q at a first instance with object Q aligned in an upper left portion of virtual tile 710. FIG. 7B shows object Q at a second instance, after it has shifted from a first position. Virtual tile 710 is similarly shifted to encompass object Q at its new position so that it is similarly aligned in the upper left portion of the tile. Virtual tile 710 can be drawn at the pixel level of a scan or at the tile level (i.e., field of view). A person of ordinary skill in the art will readily understand that a virtual tile can be created regardless of whether any preliminary stage, imaging device, or specimen alignment was performed.

In FIG. 6B, steps 610B and 620B can be the same as described in connection with FIG. 6A, steps 610A and 620A, respectively. Further, at 620B, object layout identification module 460 can compare the generated object layout map of objects on a substrate to an initial or prior object layout map of objects on a substrate and generate feedback data. The feedback data can include, but is not limited to, the amount that the dimensions of an object has changed compared to the dimensions of a reference image of the object. A reference image can include a reference template for that type of object and/or an earlier version of the object itself. The feedback data can also include the amount that an object has shifted from its initial or earlier position and/or a change in orientation of an object on a substrate.

At step 630B of FIG. 6B, object identification module 460, can transmit object mapping information and feedback data to object layout prediction module 470. Object layout prediction module 470 can use the object mapping information and feedback data from object identification module 460, in combination with other information about a substrate and the objects on the substrate, to predict the X, Y, θ coordinates of objects (e.g., orientation and shift) on a substrate for a particular stage of a manufacturing and/or examining process and/or to predict object deformity. In some embodiments, object layout prediction module 470 can compare the predicted position to the actual position information generated by object identification module 460. If the actual X, Y, θ coordinates of an object exceeds a predefined tolerance for the type of object and/or substrate being inspected (e.g., the shift in object position was much greater than predicted or the average shift in object position for the substrate was much greater than expected), then object layout prediction module 470 can generate an alert. Similarly, object layout prediction module 470 can compare the predicted object deformity to the actual object deformity information generated by object identification module 460. If the actual object deformity exceeds a predefined tolerance for the type of object and/or specimen being inspected (e.g., the deformity for the object or the average object deformation on the substrate was much greater than predicted), then object layout prediction module 470 can generate an alert.

In some embodiments, object layout prediction module 470 can compare the predicted object position to the actual position information generated by object identification module 460 and/or compare the predicted object deformity to the actual object deformity information generated by object identification module 460 to assess the accuracy of the predictions of object layout prediction module 470. In some embodiments, if the accuracy of the predictions of object layout prediction module 470 meets a predefined tolerance, for a predefined time (e.g., when object layout prediction module 470 is sufficiently trained), then steps 610B and 620B can be omitted. The information generated by object layout prediction module 470 can be transmitted directly to control module 440, which can align stage 425, imaging device 420 and a specimen to account for an object's new X, Y, θ coordinates and/or deformity, as discussed in connection with step 630A of FIG. 6A.

The division of when the particular portions of automatic mapping operation 600A and 600B are performed can vary, and no division or a different division is within the scope of the subject matter disclosed herein. Note that, in some embodiments, blocks of automatic mapping operation 600A and 600B can be performed at any suitable times. It should be understood that at least some of the portions of automatic mapping operation 600A and 600B described herein can be performed in any order or sequence not limited to the order and sequence shown in and described in connection with FIGS. 6A and 6B, in some embodiments. Also, some portions of process 600A and 600B described herein can be performed substantially simultaneously where appropriate or in parallel in some embodiments. Additionally, or alternatively, some portions of process 600A and 600B can be omitted in some embodiments. Automatic mapping operation 600A and 600B can be implemented in any suitable hardware and/or software. For example, in some embodiments, automatic mapping operation 600A and 600B can be implemented in automatic mapping microscope inspection system 400.

Figure 8:
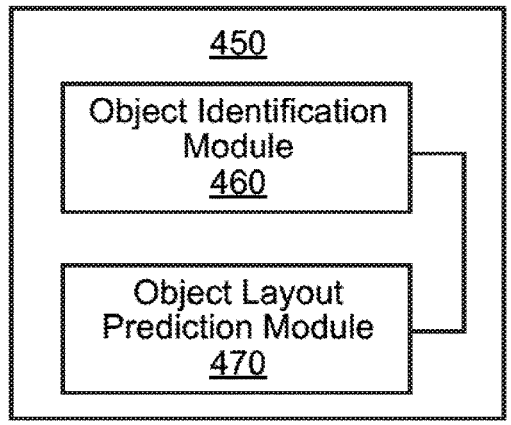
FIG. 8 shows the general configuration of an embodiment of a computer analysis system.

FIG. 8 shows the general configuration of an embodiment of computer analysis system 450, in accordance with some embodiments of the disclosed subject matter.

In some embodiments, object identification module 460 can be configured to receive a low or high resolution scan of a substrate, or a portion of a substrate, from microscope system 410 and/or any suitable computer readable media.

Object identification module 460, in some embodiments, can be configured to detect one or more objects in the received low or high resolution scan, using image processing algorithms which can include computer vision, one or more artificial intelligence algorithm(s) and/or computer algorithms. Detection of an object can be based on, e.g., a computer aided design (CAD) file of an object, an initial or earlier object layout map of a substrate that is being inspected, images of known objects, reference templates for known objects, and/or information about known objects (e.g., an object's dimensions, the mechanical and/or physical properties of an object).

Figure 9:
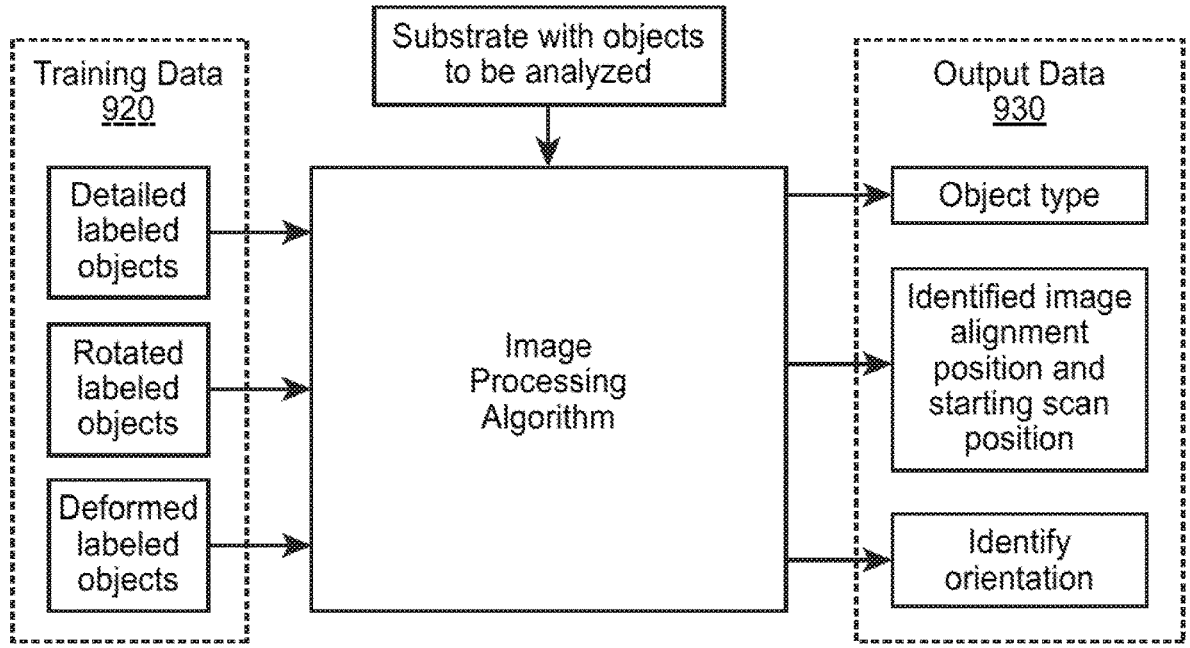
FIG. 9 shows an image processing algorithm that is first trained with training data so that the object identification module can detect and recognize objects on a substrate to provide a certain output.

In some embodiments, object identification module 460 can apply an image processing algorithm, as shown in FIG. 9, to the received substrate scan and for each object on the substrate or for a region of interest: i) detect the object; ii) determine an object type; iii) determine orientation; iv) identify an imaging alignment position; and/or v) identify a starting scan position. Object identification module 460 can further use such information in connection with a reference point on the substrate to determine the X, Y, θ coordinates of: i) each object on a substrate: ii) an imaging alignment position for each object on a substrate; and/or iii) starting scan position for each object on a substrate. Object identification module 460 can also be used to calculate object and/or substrate deformation and/or object shift from an original position (e.g., as compared to an initial object layout map).

Detection can refer to visually identifying an object on a substrate scan (e.g., by drawing a dashed box around detected objects) either in print for a printed substrate scan or visually for a substrate that is displayed on a display screen. Object identification module 460, can also be configured to determine for each detected object additional information including, but not limited to: i) object type; ii) object orientation: iii) image alignment position; and iv) a starting scan position. This information can also be displayed visually when a substrate scan is displayed on a display screen. Alternatively, a text file can be generated that provides this information.

Object identification module 460 can further be configured to map the detected objects, imaging alignment position and/or a starting scan position to an X, Y, θ position in the substrate space in relation to reference markers on the substrate. Further, object identification module 460 can compare each object to a reference image for that object type to calculate object/feature deformity. Object identification module can also, in some embodiments, calculate an object shift amount by comparing an object's current X, Y, θ coordinates with an earlier X, Y, θ position, or an expected X, Y, θ position for that object. Note, that θ or orientation represents the amount an object has rotated about a fixed point, compared to an earlier θ position of an object, or an expected θ position for the object with respect to an origin point for the substrate, as discussed in connection with FIGS. 10A and 10B.

In some embodiments, an image processing algorithm based on one or more image processing artificial intelligence algorithm(s) can be used to detect objects in the received low or high resolution scans of a substrate. An image processing algorithm based on artificial intelligence can also be used by object identification module 460 to determine for each detected object additional information including, but not limited to: i) object type; ii) object rotation; iii) image alignment position; and/or iv) a starting scan position. In some embodiments, the algorithm(s) used by object identification module 460 can consider context data like location of the object on a substrate, the type of object being inspected, the type of substrate upon which the object is located, the physical and mechanical properties of the object/substrate being inspected, similar objects on the same or similar type substrates, a reference template for the inspected object, an initial object layout map for the inspected substrate to better detect and recognize an object as well as to determine object type, object rotation, image alignment position, and/or a starting scan position.

An example of an artificial intelligence based image processing algorithm that can be used by object identification module 460 is image registration as described by: Barbara Zitova, "Image Registration Methods: A Survey," *Image and Vision Computing*, Oct. 11, 2003, Volume 21, Issue 11, pp. 977-1000, which is hereby incorporated by reference herein in its entirety. The disclosed methods are just examples and are not intended to be limiting. Further, object identification module 460 can use convolutional networks, recurrent neural networks and/or other artificial neural networks to process the received substrate scans.

In some embodiments, as shown in FIG. 9, an image processing algorithm 910 is first trained with training data 920 so that object identification module 460 can detect and recognize objects on a substrate. Training data 920 can include labeled examples of known types of objects (e.g., the different types of objects that are likely to be inspected on a particular automatic mapping microscope inspection system 400). For each type of object, training data 920 can further include labeled images of actual deformed objects (e.g., objects that have deformed as a result of the manufacturing process). In further embodiments, objects can be artificially deformed according to predefined parameters, and training data 920 can include labeled images of such deformed objects. Training data 920 can also include labeled images of each object type rotated from 0-360 degrees. Further, training data 920 can include labeled images of each type of object to be inspected that identifies a starting scan position and/or imaging alignment position within the image. In some embodiments, training data 920 can include data relating to an object's size, shape, composition, location on a substrate, physical/mechanical properties of the object and/or any other suitable characteristic. In some embodiments, training data can also include unlabeled data.

Once the image processing algorithm is trained it can be applied by object identification module 460 to a received substrate scan to detect objects, classify object type, determine object orientation, identify an image alignment position and/or a starting scan position (individually and collectively, output data 930).

Object identification module 460 can further be configured to calculate object deformity, determine an object shift amount, map a detected object to X, Y, θ coordinates on a substrate, map an identified image alignment position for an object to X, Y, θ coordinates on a substrate, map an identified starting scan position for an object to an X, Y, θ position on a substrate and define an imaging sequence based on object type and orientation. Each of these functions can be performed with or without using artificial intelligence and will be described in greater detail in the paragraphs that follow.

In some embodiments, object identification module 460 can calculate object deformity by comparing deviations in overall dimensions between a detected object and a reference image or between specific features of an object and a reference image. The reference image can be a reference template for that object type and/or an earlier image of the detected object.

Once an object has been detected, object identification module 460, can map the detected object to a specific X, Y position in a known coordinate system, as discussed in connection with FIGS. 3A and 3B. Similarly, object identification module 460 can map an imaging alignment position of an object and/or a starting scan position of an object to a specific X, Y position in a known coordinate system, as discussed in connection with FIGS. 3A and 3B.

In some embodiments, an object's θ position on the substrate can be calculated using the θ position information output by image processing algorithm. For example, based on training data of similar objects having a similar orientation, the image processing algorithm can determine an object's θ position. In other embodiments, the image processing algorithm can apply image registration methods to compare an object to a reference image and determine the θ position. Some example image registration methods to determine rotation are described by Barbara Zitova, "Image Registration Methods: A Survey," *Image and Vision Computing*, Oct. 11, 2003, Volume 21, Issue 11, pp. 977-1000, which is hereby incorporated by reference herein in its entirety. In further embodiments, object identification module 460 can determine a baseline orientation for each object type using a specific feature or reference point, within a reference object. The orientation is with respect to an origin point of a substrate. To calculate how much the orientation of an object has changed, object identification module 460 can then compare a feature or reference point for the detected object to a similar feature within the reference object using an affine transformation. Affine transformation is described for example by Donald H. House et al., *Foundations of Physically Based Modeling and Animation*, 335-341, 2017, which is hereby incorporated by reference herein in its entirety.

Figure 10A:
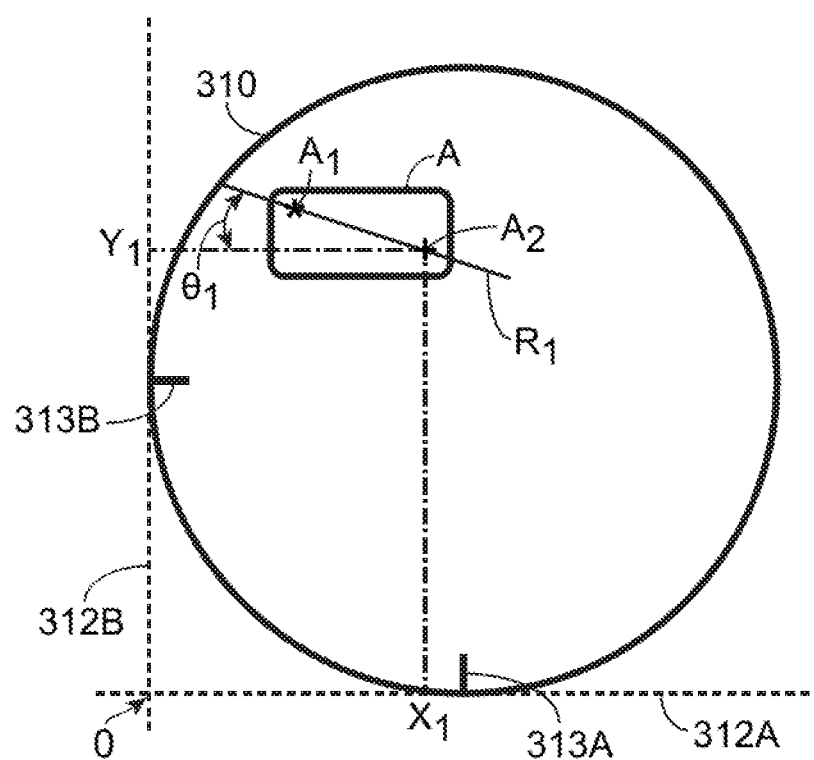
FIGS. 10A and 10B show an example embodiment where orientation is calculated based on the rotation of an object A from a first point in time (as represented by FIG. 10A) to a second point in time (as represented by FIG. 10B), using the same two reference points on object A: $A_1$ and $A_2$.
Figure 10B:
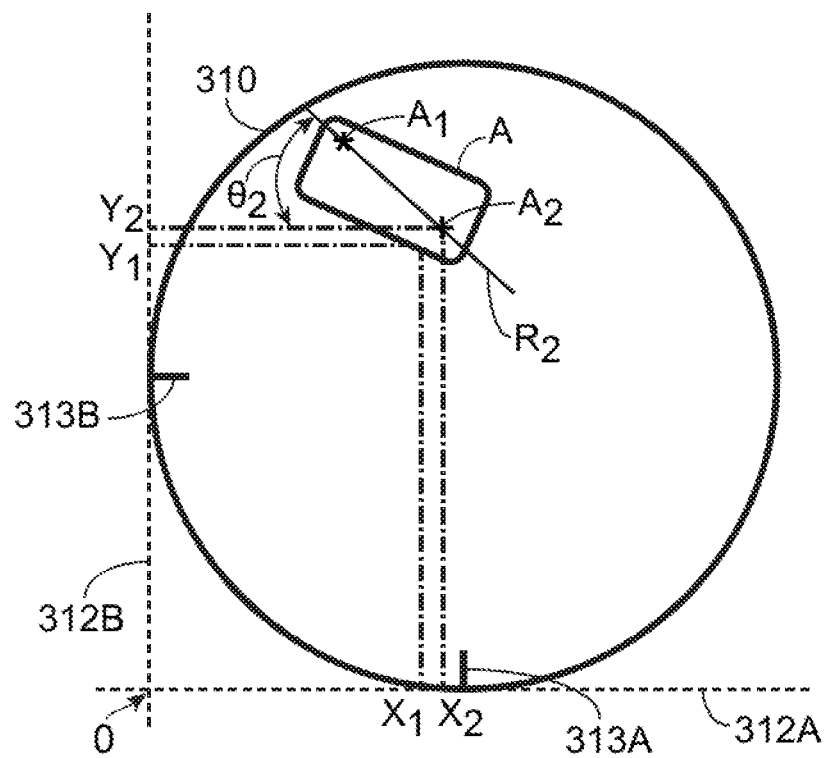

FIGS. 10A and 10B, show an example embodiment where orientation is calculated based on the rotation of an object A from a first point in time (as represented by FIG. 10A) to a second point in time (as represented by FIG. 10B), using the same two reference points on object A: $A_1$ and $A_2$. $A_1$ and $A_2$ are just examples and other reference points or features on object A can be used. More specifically, as shown in FIG. 10A, a first reference point, $A_1$ for object A can be located at $X_1Y_1$ at a first point in time using a known coordinate system. A reference line ($R_1$) can be drawn through reference points A1 and a second reference point A2. A first angle $\theta_1$ can be measured based on the intersection of the X axis and $R_1$. As shown in FIG. 10B, the same reference point $A_1$ for object A can be located at $X_2Y_2$ at a second point in time. A reference line ($R_2$) can be drawn through reference points A1 and reference point A2 at their new locations. A second angle $\theta_2$ can be measured based on the intersection of the X axis and $R_2$. $\theta_2$ can be subtracted from $\theta_1$ to determine the orientation of object A in FIG. 10B.

In some embodiments, object identification module 460 can be programmed to associate a predefined imaging sequence for each known object type. When a detected object is classified, object identification module 460 can associate the detected object with a predefined imaging sequence for that object type. Further, object identification module 460 can transmit this information to control module 440 or to imaging device 420 to capture images for the detected object applying the predefined imaging sequence.

In some embodiments, object identification module 460 can calculate object shift amount by comparing a current XY location of an object on a substrate to an initial or prior XY location of the object (e.g., based on an initial or prior object layout map). Object identification module 460 can transmit this information to object layout map generation module 470 and/or object layout prediction module 470.

In some embodiments, object layout prediction module 470 can receive feedback data and/or object mapping information from object identification module 460, along with other context data such as the type of object being inspected, the type of substrate upon which the object is located, the physical and mechanical properties of the object/substrate being inspected, similar objects on the same or similar type substrates, a reference template for the inspected object, an initial object layout map for the inspected substrate, etc. The feedback data can include, but is not limited to, an X, Y, θ position for each object on a substrate at a specific stage in a manufacturing or examination process, the amount each object on a substrate has deformed, shifted and/or changed its orientation during the manufacturing or examination process. Object layout prediction module 470 can use this information to make predictions about the X, Y, θ positions of objects at different stages during the manufacturing or examination process and/or the amount that the objects are likely to deform. This information can be used to appropriately position objects on a substrate and/or to calibrate steps and/or components in a manufacturing or examination process to accommodate expected shifting and/or deformation of an object and/or substrate. This information can also be used to determine if objects on a substrate have moved their position beyond a predicted amount or objects and/or substrate have deformed beyond a predicted amount.

Figure 11:
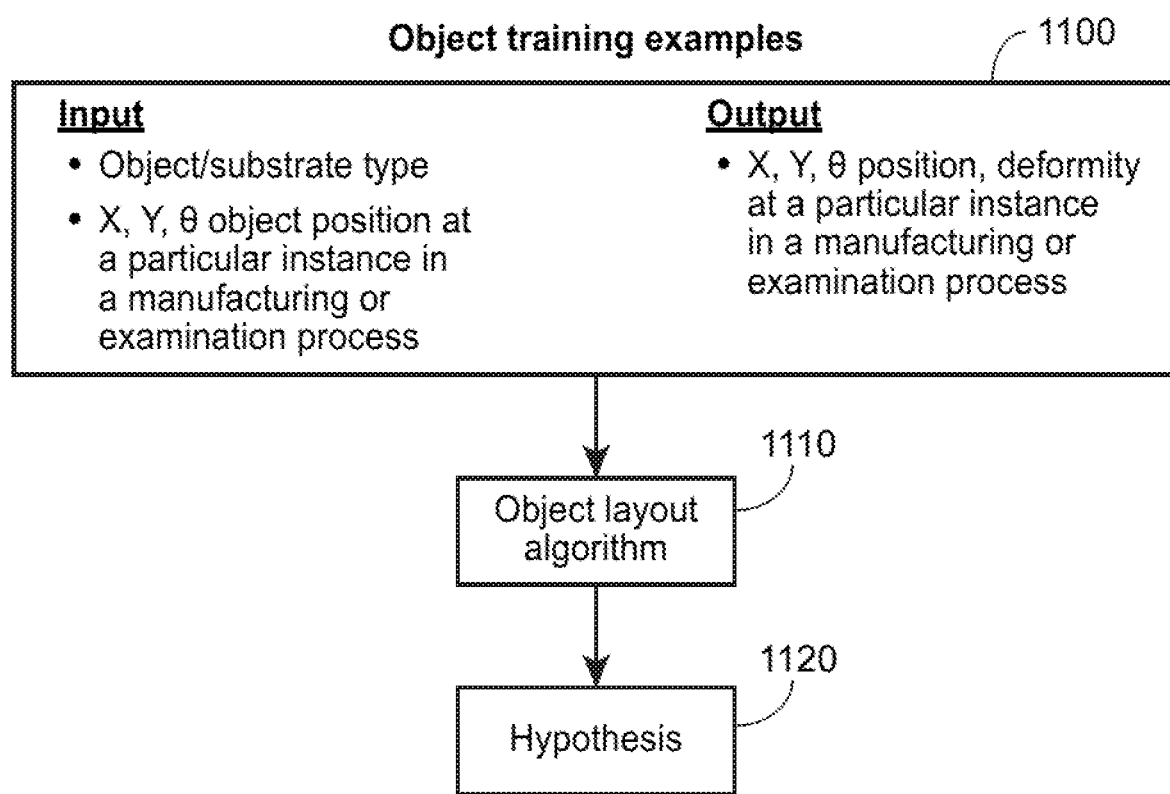
FIG. 11 shows an example training model that uses certain inputs and outputs to feed into a specimen layout algorithm to obtain a certain hypothesis

In some embodiments, object layout prediction module can receive an initial object layout of a substrate and apply a layout prediction algorithm using artificial intelligence, as shown in FIG. 11 to determine a new object layout of the substrate at a particular stage in a manufacturing and/or examination process. The new object layout map can include for each object on the initial object layout (or any region of interest) an X, Y, θ position, and/or the amount that the objects and/or substrate are likely to deform for a particular stage in a manufacturing and/or examination process.

The object layout prediction module can be implemented, in some embodiments, using a linear regression model or a multiple linear regression model. Linear regression modeling is a machine learning technique for modeling linear relationships between a dependent variable and one or more independent variables. A simple linear regression model utilizing a single scalar prediction can be used to perform the object layout prediction described herein. Alternatively, a multiple linear regression model utilizing multiple predictors can be used to perform the object layout prediction described herein.

In some embodiments, the object layout prediction algorithm is first trained with training data. The training data can include a pair (also called a training example) of input features (X) and output or target variables (Y) that the regression learning algorithm is trying to predict. The training examples 1100 can be used to learn a function: hypothesis (H): X→Y, so that H(X) is a reasonable predictor for the corresponding value of Y. FIG. 11 shows an example training model according to some embodiments of the disclosed subject matter. The input of training examples 1100 can include, for each object on a substrate: a current X, Y, θ position at a first stage in a manufacturing process (e.g., initial layout map, photoresist step, cleaning step, pre-dicing step) and an object/substrate type. The output of training examples 1100 can include for each object on a substrate an X, Y, θ position, deformity, and/or shift amount at a second stage in a manufacturing process. Once trained, object layout algorithm 1110, can receive an object layout map for a substrate at a first manufacturing and/or examination instance, as well as other information about object/substrate type, and predict X, Y, θ positions of the objects on the substrate and/or amount of deformity to expect for the objects and/or substrate at a second instance of a manufacturing or examination process. Object layout algorithm 1110 can continuously or periodically receive feedback data from object identification module 460 and modify hypothesis (H).

As explained in connection with 630B of FIG. 6B, object layout prediction module 470 can compare the predicted position of objects on a substrate to the actual position information generated by object identification module 460 and determine whether to generate an alert. Further, object layout prediction module 470 can compare the predicted object position to the actual position information generated by object identification module 460 and/or compare the predicted object deformity to the actual object deformity information generated by object identification module 460 to assess the accuracy of the predictions of object layout prediction module 470.

The functionality of the components for automatic mapping microscope inspection system 400 can be combined into a single component or spread across several components. In some embodiments, the functionality of some of the components (e.g., computer processing by computer analysis system 450) can be performed remotely from microscope system 410. In some embodiments, control analysis system can be combined into microscope system 410.

Note that automatic mapping microscope inspection system 400 can include other suitable components not shown. Additionally or alternatively, some of the components included in automatic mapping microscope inspection system 400 can be omitted.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, etc.), non-transitory optical media (such as compact discs, digital video discs, Blu-ray discs, etc.), non-transitory semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

The various systems, methods, and computer readable mediums described herein can be implemented as part of a cloud network environment. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. The cloud can provide various cloud computing services via cloud elements, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. A person of ordinary skill in the art would understand that the term mechanism can encompass hardware, software, firmware, or any suitable combination thereof.

Unless specifically stated otherwise as apparent from the above discussion, it is appreciated that throughout the description, discussions utilizing terms such as "determining," "providing," "identifying," "comparing" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of non-transient computer-readable storage medium suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps and system-related actions. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The automatic mapping of fluid objects on a substrate mechanism, method and system have been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure. The scope of the present disclosure is limited only by the claims that follow.

The invention claimed is:

1. A method for mapping objects on a substrate using a microscope inspection system comprising:
    providing a microscope inspection system comprising a microscope system and a computer analysis system,
        wherein the microscope system includes a light source, imaging device, stage for moving a substrate disposed on the stage, and a control module, and
        wherein the computer analysis system includes an object identification module; and
    performing a scan of the substrate using the microscope inspection system;
    identifying for each of the objects on the substrate, an object position on the substrate including a set of X, Y, and θ coordinates using algorithms, machines and systems including artificial intelligence and image processing algorithms,
        wherein at least one of the objects is fluid and has shifted from a prior position or deformed from a prior size, and wherein the fluid object includes electronic objects on a substrate or biological objects such as cells, tissue or the like found in a biological specimen mounted on a slide; and
    generating, by the computer analysis system, object mapping information that reflects the position of each of the objects and a shift or deformity amount for the at least one of the objects with respect to the prior position or the prior size of the at least one of the objects based on an identification of the prior position or the prior size of the at least one of the objects,
        wherein the step of generating object mapping information is done automatically using algorithms, machines and systems including artificial intelligence and image processing algorithms.

2. The method according to claim 1, further comprising aligning the stage, the imaging device and objects to reflect the position of the at least one object that has shifted using the object mapping information.

3. The method according to claim 1, wherein generating the object mapping information comprises generating an object layout map.

4. The method according to claim 1, wherein the computer analysis system further includes an object layout prediction module.

5. The method according to claim 1, wherein the microscope system further includes a low resolution objective and a high resolution objective.

6. The method according to claim 1, wherein the object identification module is configured to receive a low or high resolution scan of the substrate from the microscope system.

7. The method according to claim 6, wherein the object identification module is configured to detect one or more objects in the received low or high resolution scan, using computer vision, one or more artificial intelligence algorithms and/or computer algorithms.

8. The method according to claim 6, wherein the object identification module can apply an image processing algorithm to the received substrate scan and for each object on the substrate: i) detect the object; ii) determine an object type; iii) determine orientation; iv) identify an imaging alignment position; and/or v) identify a starting scan position, and
    wherein the object identification module can use the object mapping information in connection with a reference point on the substrate to determine the X, Y, θ coordinates of: i) each object on the substrate: ii) an imaging alignment position for each object on a substrate; and/or iii) a starting scan position for each object on the substrate.

9. A method for mapping objects on a substrate using a microscope inspection system comprising:
providing a microscope inspection system comprising a microscope system and a computer analysis system,
wherein the microscope system includes a light source, imaging device, stage for moving a substrate disposed on the stage, and a control module, and
wherein the computer analysis system includes an object identification module and an object layout prediction module; and
performing a scan of the substrate using the microscope inspection system;
identifying for each of the objects on the substrate, an object position on the substrate including a set of X, Y, and θ coordinates using algorithms, machines and systems including artificial intelligence and image processing algorithms,
wherein at least one of the objects is fluid and has shifted from a prior position or deformed from a prior size, and wherein the fluid object includes electronic objects on a substrate or biological objects such as cells, tissue or the like found in a biological specimen mounted on a slide; and
generating, by the computer analysis system, object mapping information that reflects the position of each of the objects and a shift or deformity amount for the at least one of the objects with respect to the prior position or the prior size of the at least one of the objects based on an identification of the prior position or the prior size of the at least one of the objects,
wherein the step of generating object mapping information is done automatically using algorithms, machines and systems including artificial intelligence and image processing algorithms.

10. The method according to claim 9, wherein the microscope system further includes a low resolution objective and a high resolution objective.

11. The method according to claim 9, wherein the object identification module is configured to receive a low or high resolution scan of the substrate from the microscope system.

12. The method according to claim 11, wherein the object identification module is configured to detect one or more objects in the received low or high resolution scan, using computer vision, one or more artificial intelligence algorithms and/or computer algorithms.

13. The method according to claim 11, wherein the object identification module can apply an image processing algorithm to the received substrate scan and for each object on the substrate: i) detect the object; ii) determine an object type; iii) determine orientation; iv) identify an imaging alignment position; and/or v) identify a starting scan position, and
wherein the object identification module can use the object mapping information in connection with a reference point on the substrate to determine the X, Y, θ coordinates of: i) each object on the substrate: ii) an imaging alignment position for each object on a substrate; and/or iii) a starting scan position for each object on the substrate.

14. The method according to claim 9, wherein the object prediction layout module receives feedback data and/or the object mapping information from the object identification module.

15. The method according to claim 14, wherein the feedback data includes X, Y, θ coordinates for each object on the substrate at a specific stage in a manufacturing or examination process, and the amount each object on the substrate has deformed, shifted and/or changed its orientation during the manufacturing or examination process.

16. The method according to claim 15, wherein the object layout prediction module can receive an initial object layout of the substrate and apply a layout prediction algorithm using artificial intelligence to determine a new object layout of the substrate at a particular stage in a manufacturing and/or examination process.

17. The method according to claim 9, wherein the object prediction layout module is implemented using a linear regression model or a multiple linear regression model.

18. The method according to claim 9, wherein the object prediction layout module generates an alert when the X, Y, θ coordinates of the object exceed a predefined tolerance for a type of object and/or substrate being inspected.

19. A system for mapping fluid objects on a substrate comprising:
a microscope inspection system including a microscope system,
wherein the microscope system includes a light source, imaging device, stage for moving a substrate disposed on the stage, and a control module, and
wherein the imaging device scans the substrate;
an object layout identification module for identifying for each of the objects on the substrate, an object position on the substrate including a set of X, Y, and θ coordinates using algorithms, machines and systems including artificial intelligence and image processing algorithms,
wherein at least one of the objects is fluid and at least one of the objects has shifted from a prior position or deformed from a prior size, and wherein the fluid object includes electronic objects on a substrate or biological objects such as cells, tissue or the like found in a biological specimen mounted on a slide; and
wherein the object layout identification module generates object mapping information that reflects the position of each of the objects and a shift or deformity amount for the at least one of the objects with respect to the prior position or the prior size of the at least one of the objects based on an identification of the prior position or the prior size of the at least one of the objects.

* * * * *